United States Patent
Lindoff et al.

(10) Patent No.: US 9,907,005 B2
(45) Date of Patent: Feb. 27, 2018

(54) HANDOVER EVENT PRIORITIZATION

(75) Inventors: Bengt Lindoff, Bjärred (SE); Lennart Morén, Båstad (SE); Anders Wallén, Ystad (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 387 days.

(21) Appl. No.: 14/125,402

(22) PCT Filed: Jun. 15, 2011

(86) PCT No.: PCT/EP2011/059923
§ 371 (c)(1),
(2), (4) Date: Mar. 4, 2014

(87) PCT Pub. No.: WO2012/171559
PCT Pub. Date: Dec. 20, 2012

(65) Prior Publication Data
US 2014/0194121 A1   Jul. 10, 2014

(51) Int. Cl.
*H04W 36/00*   (2009.01)
*H04W 36/24*   (2009.01)
*H04W 36/30*   (2009.01)

(52) U.S. Cl.
CPC ....... *H04W 36/24* (2013.01); *H04W 36/0083* (2013.01); *H04W 36/30* (2013.01)

(58) Field of Classification Search
None
See application file for complete search history.

(56) References Cited

U.S. PATENT DOCUMENTS

| | | |
|---|---|---|
| 2004/0157608 A1 | 8/2004 | Kurose et al. |
| 2007/0149195 A1 | 6/2007 | Choe et al. |
| 2009/0325501 A1* | 12/2009 | Somasundaram et al. ............ 455/67.11 |
| 2010/0120429 A1* | 5/2010 | Kazmi et al. ............ 455/436 |

(Continued)

FOREIGN PATENT DOCUMENTS

| | | |
|---|---|---|
| CN | 101340722 A | 1/2009 |
| WO | 2009131870 A1 | 10/2009 |

OTHER PUBLICATIONS

ETSI TS 36.331 (v8.4.0) (Dec. 20, 2008).*
(Continued)

*Primary Examiner* — Steve D Agosta
(74) *Attorney, Agent, or Firm* — Coats & Bennett, PLLC

(57) ABSTRACT

To communicate wireless handover events, a communications device associated with a serving cell of a cellular network determines, based on at least one or more first measurement results indicative of cell quality parameters of a plurality of cells of the cellular network, a first handover event associated with a first one of the cells, initiates communication of a first handover message indicative of the determined first handover event to a network entity of the cellular network, and, based on at least one or more second measurement results, determines a plurality of further handover events associated with respective ones of the cells, resulting in a plurality of pending handover events waiting to be communicated to a network entity of the cellular network. The communications device also determines a priority order for at least a subset of the pending handover events. The subset includes handover events associated with different cells.

19 Claims, 3 Drawing Sheets

(56) References Cited

U.S. PATENT DOCUMENTS

2011/0065433 A1 3/2011 Iwamura et al.
2011/0149871 A1 6/2011 Liu

OTHER PUBLICATIONS

3GPP TS 36.331 V8.3.0 (Sep. 2008) Radio Resource Control (RRC).*
LG Electronics Inc, "Mobility State Detection Enhancement for HetNet", 3GPP TSG-RAN WG #74, Barcelona, Spain, May 9, 2011, pp. 1-2, R2-113302, 3GPP.

* cited by examiner

HANDOVER EVENT PRIORITIZATION

TECHNICAL FIELD

Disclosed herein are a method, implemented by a communications device, for communicating wireless handover events, and a communications device operable to implement the method.

BACKGROUND

Cellular communications systems for providing communications services to mobile terminals are known and widely used. The cellular structure of such systems allows a mobile terminal connected to one cell (the so-called serving cell) of the system to switch to a neighbouring cell, e.g. when a neighbouring cell becomes more suitable to be connected to due to a movement of the mobile terminal. This process of switching cells is normally referred to as handover (HO). To this end, a mobile terminal connected to a network node makes on a regular basis measurements on the serving as well as detected neighbouring cells in order to find the most suitable cell to be connected to. In case another cell than the currently serving cell becomes strong, a HO is triggered and the terminal informs the cellular network (NW) to change serving cell. The NW then makes necessary internal signalling and sets up the HO and then the terminal is informed and the HO is executed.

In certain situations, a given change in the radio environment may trigger multiple events. For example when the signal strength of the serving cell drops and the signal cell of a neighbouring cell increases, this may trigger multiple handover events, e.g. an event of a first event type indicating that the signal strength of the serving cell has dropped below a predetermined threshold, an event of a second event type indicating that the signal strength of the neighbouring cell has increased above a predetermined threshold, and an event of a third type indicating that the signal strength of the neighbouring cell has exceeded the signal strength of the serving cell by a predetermined margin.

WO 2009/131870 discloses a method for prioritizing and reporting handover events. Even though this prior art method reduces the quantity of reported events by avoiding communicating multiple redundant handover events, it remains a problem to more efficiently manage handover scenarios in rapidly changing radio environments.

This is especially true in dense urban scenarios, with high load and complex radio environment (for example in metropolitan areas with high buildings like Manhattan/Hong Kong etc), where cells may appear and disappear very fast when a mobile terminal moves around in such an environment. In order to make HO and mobility work in such complex environments, good cell planning and network parameter tuning, though important and beneficial, may not be enough to ensure mobile connectivity with low disturbances or even interruption.

SUMMARY

Disclosed herein are embodiments of a method, implemented by a communications device, for communicating wireless handover events, the communications device being associated with at least one serving cell of a cellular communications network, the method comprising:

determining, based on at least one or more first measurement results indicative of one or more cell quality parameters of respective ones of a first plurality of cells of the cellular communications network, a first handover event associated with a first one of the first plurality of cells;

initiating communication of a first handover message indicative of the determined first handover event to a network entity of the cellular network;

determining, based on at least one or more second measurement results indicative of one or more cell quality parameters of respective ones of a second plurality of cells of the cellular communications network, a plurality of further handover events associated with respective ones of the second plurality of cells, resulting in a plurality of pending handover events waiting to be communicated to a network entity of the cellular network;

determining a priority order for at least a subset of the pending handover events, wherein the subset comprises handover events associated with different cells.

Hence, in case of multiple HO events associated with at least two different cells and therefore stacked in a queue for transmission to the network node, the communication device performs a prioritization of the triggered HO events resulting in a prioritized transmission order of handover events associated with different cells. The transmission order may thus be different compared to the triggered event order. For example, the prioritization may cause a first handover event for one cell to be transmitted before a second handover event for another cell, even though the first handover event may have been triggered after the second handover event. In some embodiments, some of the HO events, after the prioritization, may even be discarded.

Consequently, embodiments of the method described herein reduce the risk that handover events are triggered in respect of cells that are less likely to be suitable, thus providing a more robust terminal behaviour in complex radio environments, and reducing the risk for dropped calls or connections and thereby improving the user experience. In particular, in situations where the signal strength of many cells vary at a relatively high rate compared to the delay introduced for each initiated handover event, the risk of handovers being initiated to "outdated" or otherwise less suitable cells is reduced.

For the purpose of the present description, the term handover event is intended to refer to any type of detectable event suitable for facilitating a handover decision between different cells of a cellular communications system or a decision related to handover decisions, such as a decision to add or remove a cell from a list of active cells. In some embodiments, a handover event may be triggered by a communications device based on measurement results obtained by the communications device fulfilling a predetermined trigger condition. In some embodiments a trigger condition may be determined to be fulfilled if a measurement value fulfils a predetermined condition over a predetermined trigger interval. A handover event may have associated with it an event type, e.g. indicative of the type of trigger condition. A handover event may be associated with one or more cells. For example, a handover event may be associated with a serving cell and a neighbouring cell. In some communication systems, e.g. in the Wideband Code Division Multiple Access (WCDMA) standard, links to multiple cells may simultaneously be establish. This feature is commonly referred to as soft handover when the cells are located at different sites, softer handover when the cells are located at the same site or macro diversity etc. The set of cells that a mobile terminal is connected to is commonly denoted the active set. Generally different cells may be identifiable by their respective logical cell ID.

The network entity to which the handover message is communicated may comprise a base station, a site controller, an access point, or any other type of network device operable in a cellular communications system.

Examples of cell quality parameters may include signal strength, a signal-to-interference ratio, and any other suitable measurable parameter indicative of a cell's suitability for providing communications services to the communications device, as well as combinations thereof. The first and second measurement results may be the same measurement results or at least partly different measurement results. For example, the second measurement results may comprise measurement results obtained subsequent to the obtaining of the first measurement results. Moreover the first and second plurality of cells may be or comprise the same set of cells, or they may be different (overlapping or non-overlapping) sets of cells. Accordingly, the method may further comprise obtaining a plurality of first measurement results indicative of one or more cell quality parameters of respective ones of the first plurality of cells of the cellular communications network; if the second measurement results include measurements not included in the first measurement results (e.g. measurements related to a cell not included in the first plurality of cells), the method may further comprise obtaining one or more second measurement results indicative of one or more cell quality parameters of respective ones of the second plurality of cells of the cellular communications network. The measurements may be related to the serving cell(s) and/or one or more neighbouring cells, different from the serving cell.

In some embodiments, the method comprises determining a property of the radio environment of the communications device, and selectively performing the determination of a priority order responsive to the determined property of the radio environment. Examples of such a property may include the frequency/time/distance by which cells appear and disappear. In some embodiments the determination of a priority order may be conditioned on, or based on, an estimated validity period of the pending handover events. The validity period of a handover event may e.g. be determined by an expected validity period of the measurement results leading to the determined handover event. For example, in situations where the estimated validity period is long, e.g. longer than a predetermined threshold, the communications device may send all handover events in the order they are triggered, thus saving the processing resources otherwise used for performing the (re-)prioritization. Alternatively or additionally, events having a validity period smaller than a predetermined threshold or smaller than an estimated handover time may be discarded. Alternatively or additionally, handover events having a short validity period may be given a lower priority than handover events having a longer validity period.

The validity period of a handover event may e.g. be estimated by an estimated speed of the movement of the communications device, by an estimated rate of occurrence of handover events, by a rate of change of the measurement result that has led to the triggering of the handover event, etc., or combinations thereof.

Additionally or alternatively, the priority order may be based on the timing of the handover events, e.g. by assigning a higher priority to handover events that have been triggered more recently compared to handover events that have been triggered earlier. Additionally or alternatively, the priority order may be based on the event types of the handover events.

In some embodiments, e.g. in the case of 3GPP Long Term Evolution (LTE) systems, the communication of handover messages may involve multiple messages including an initial message and a subsequent message, where only the subsequent message comprises information about the handover event. In such an embodiment, during the period between transmitting the initial message and transmitting the subsequent message, one of the pending handover events may become more suitable to be communicated than the first handover event. Hence, it may be advantageous to re-prioritise the handover events after transmitting the initial message. Accordingly, in some embodiments initiating communication of a handover message comprises communicating an initial request to communicate a message; and wherein determining a priority order comprises determining a priority order for the first handover event and for at least a subset of the pending handover events; and wherein the method further comprises:

receiving a response to the initial request;
selecting, based on the priority order, a handover event from the first and the pending handover events; and
communicating a handover message indicative of the selected handover event.

Alternatively or additionally, in some embodiments, the method further comprises determining, from at least the second measurement results and based on at least one predetermined selection criterion, one or more likely handover events, the selection criterion being indicative of a likelihood of a handover event being triggered within a predetermined future period of time; and wherein determining a priority order comprises determining a priority order for the determined likely handover events and for at least a subset of the pending handover events. Hence, the prioritization of handover events may further take handover events into consideration that have not yet been triggered but that are very likely to be triggered shortly, e.g. during the expected delay caused by the ongoing communication of the first handover event. Hence, a likely handover event may be determined as a handover event having at least a predetermined likelihood to be triggered within a predetermined period of time. For example, the predetermined selection criterion may comprise the second measurement results having exceeded a first threshold slightly smaller than a second threshold required for determining a handover event. Another example of a selection criterion may comprise the second measurement results having exceeded a threshold required for determining a handover event during a period of time larger than a first threshold time but smaller than a second threshold time required for triggering a handover event.

The present invention relates to different aspects including the method described above and in the following, corresponding devices, systems, and products, each yielding one or more of the benefits and advantages described in connection with one of the above-mentioned aspects, and each having one or more embodiments corresponding to the embodiments described in connection with at least one of the above-mentioned aspects.

In particular, disclosed herein are embodiments of a communications device adapted to perform the steps of the method defined herein. Embodiments of a communications device may comprise:

a measurement unit operable to obtain a plurality of measurement results indicative of one or more cell quality parameters of respective ones of a plurality of cells of the cellular communications network;

a control unit operable to determine, based on at least a first set of measurement results obtained by the measurement unit, a first handover event associated with a first one of the plurality of cells;

a message generator unit operable to initiate communication of a first handover message indicative of the determined first handover event to a network entity of the cellular network;

wherein the control unit is further operable to determine, based on at least a second set of measurement results obtained by the measurement unit, a plurality of further handover events associated with respective ones of the plurality of cells, resulting in a plurality of pending handover events waiting to be communicated to a network entity of the cellular network; and to determine a priority order for at least a subset of the pending handover events, wherein the subset comprises handover events associated with different cells.

The term communications device as used herein is intended to comprise any wireless transmit/receive equipment, portable radio communications equipment, other handheld or portable devices, and other user equipment of a cellular communications system; and integrated circuits, microprocessors, chips or chipsets for use in such equipment. The term portable radio communications equipment includes all equipment such as mobile terminals, e.g. mobile telephones, pagers, communicators, electronic organisers, smart phones, personal digital assistants (PDAs), handheld computers, or the like.

BRIEF DESCRIPTION OF THE DRAWINGS

The above and other aspects will be apparent and elucidated from the embodiments described with reference to the drawing in which.

DETAILED DESCRIPTION

Figure 1:
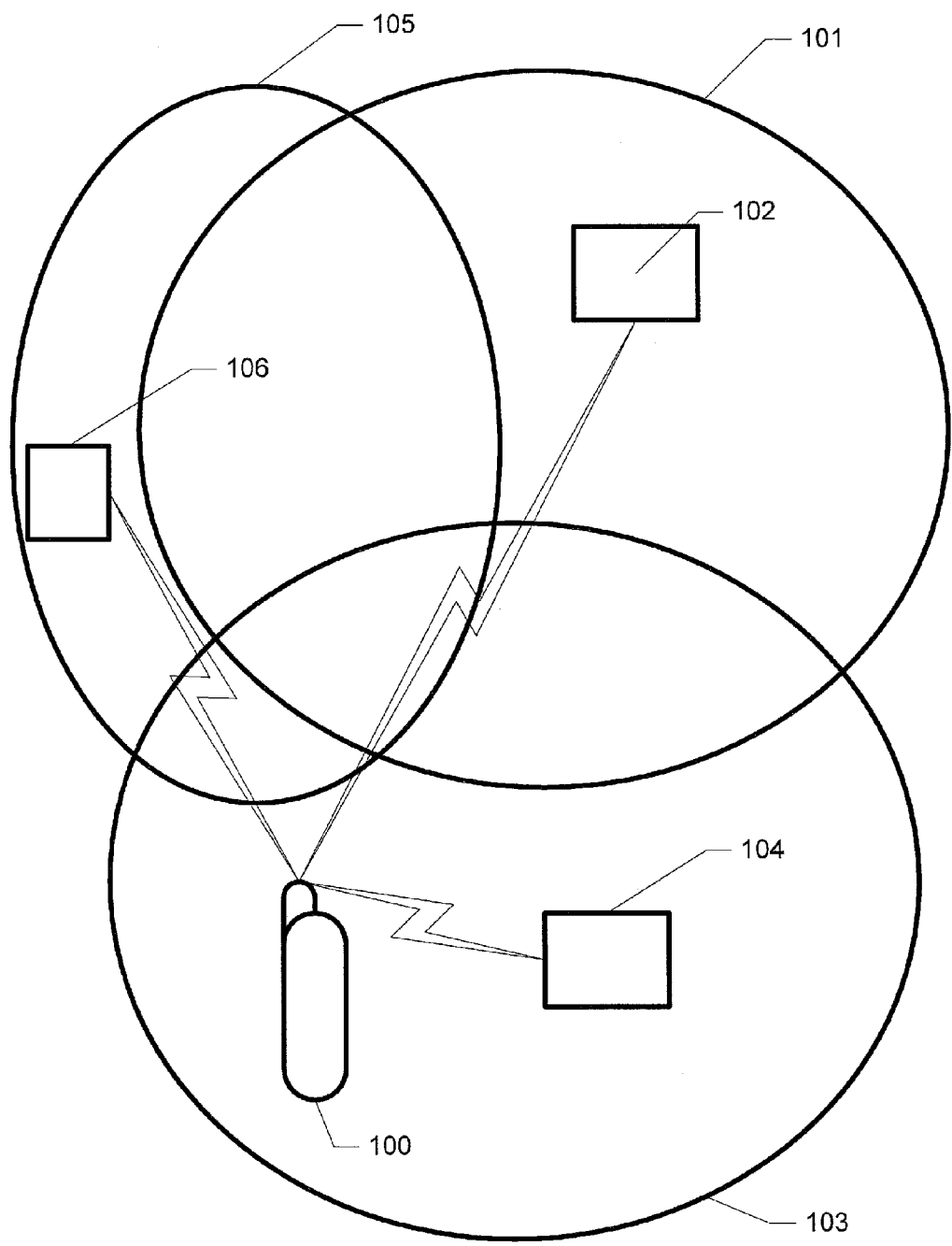
FIG. 1 illustrates an example of a cellular communications system including a plurality of cells.

FIG. 1 illustrates an example of a cellular communications system including a plurality of cells. The cellular communications system may be WCDMA release 99 network, an LTE network, or a cellular network operating according to another suitable cellular communications standard. The communications network comprises three cells, 101, 103, and 105, respectively, each comprising a base station 102, 104, and 106, respectively, e.g. an evolved Node-B (eNode). It will be appreciated, however, that a communications system may comprise any number of cells.

In the example of FIG. 1, cell 103 is a serving cell whose base station 104 serves at least one mobile terminal 100 or other wireless transmit/receive unit. The cells 101 and 105 that currently do not serve the mobile terminal 100 but that are visible by the mobile terminal 100 are also referred to as neighbouring cells. It will be appreciated that the terms serving cell and neighbouring cell describe the cells relative to a communications device, i.e. any physical cell may be a serving cell for one communications device and a neighbouring cell in respect of another communications device.

The mobile terminal 100 is operable to receive a serving cell signal from the base station 104 of the serving cell 103, and to receive respective neighbouring cell signals from the base stations 102 and 106 of the respective neighbouring cells 101 and 105.

In an LTE network, the following handover events have been defined for intra-frequency and inter-frequency events: Event A1: the strength of a serving cell signal becomes better than an absolute threshold; Event A2: the strength of the serving cell signal becomes worse than an absolute threshold; Event A3: the strength of a neighbouring cell signal becomes an amount of offset better than the serving cell signal; Event A4: the strength of the neighbouring cell signal becomes better than an absolute threshold; and Event A5: the strength of the serving cell signal becomes worse than a first absolute threshold, and the strength of the neighbouring cell signal becomes better than a second absolute threshold. In WDCMA Release 99 similar events have been defined and labelled 1A, 1B, 1C, respectively.

In the following, embodiments of prioritisation and reporting of handover events will be described in the context of WCDMA, Release 99. However the invention is not restricted to that case. Furthermore when an HO event is discussed it typically refers to an intra frequency HO event in WCDMA (1A, 1B, 1C); however it could also be an inter frequency or Inter radio access technology handover (IRAT HO) event (2A, 2B, 3A, 3B etc) or related to an intra or inter HO event in LTE (Event A1, A2, A3, B1, etc).

In order to facilitate triggering of such handover events, the mobile terminal performs measurements of the signal strength of the signals received from the respective base stations. Additionally or alternatively, the mobile terminal may perform other measurements, e.g. of the respective signal-to-noise ratio, of a Doppler shift of the received signals indicating the speed with which the mobile terminal moves relative to the respective base station. When a measurement in respect of one of the cells fulfils a corresponding trigger condition for a predetermined period of time (the Time-to-Trigger or TTT), the mobile terminal initiates reporting of a corresponding trigger event associated with that cell. To this end, the mobile terminal transmits a handover event message to the currently serving cell.

Figure 2A:
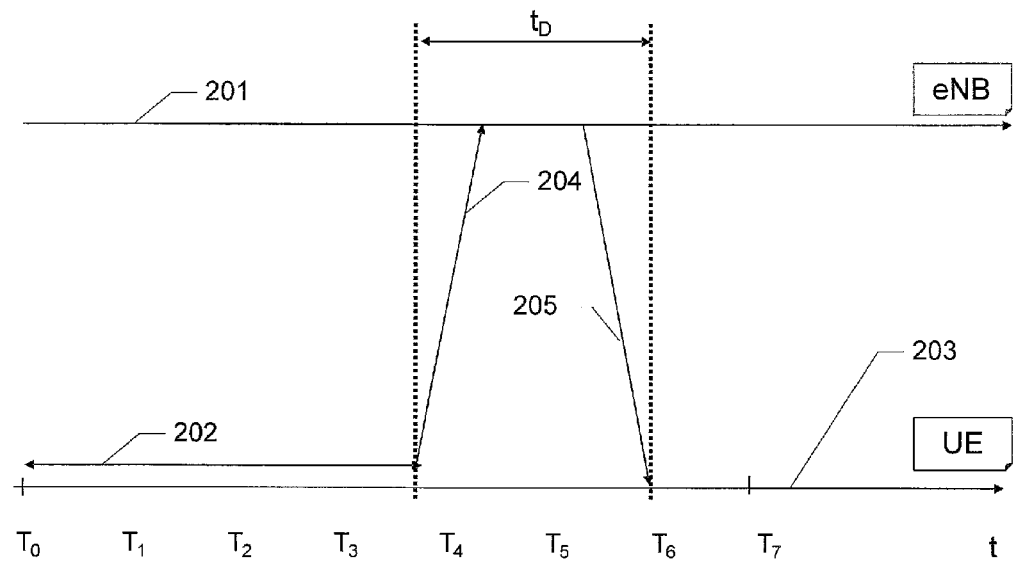
FIGS. 2a-b illustrate examples of reporting procedures for reporting handover events.
Figure 2B:
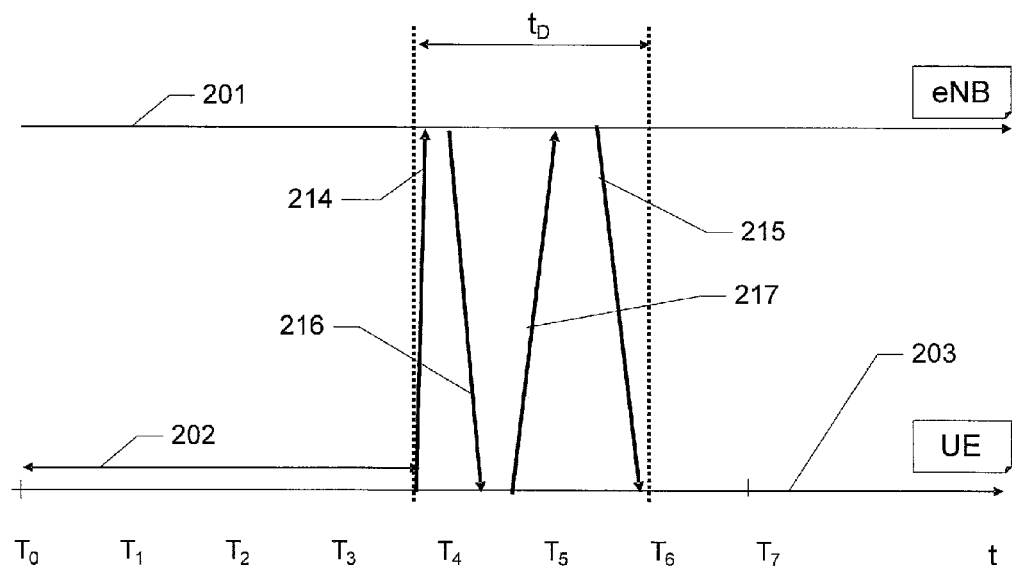

FIGS. 2a-b illustrate examples of reporting procedures for reporting handover events. A HO is always made with some delay. The delay originates typically from three sources: a Time-To-Trigger (TTT) delay, a delay over the radio interface, and delay in the network node. FIG. 2a shows an example of HO signalling in WCDMA Release 99. On a regular basis, e.g. a times T0, T1, etc., the mobile terminal (illustrated by time line 203) makes measurements on its serving cell (or serving cells in the active set in case of soft handover) as well as on detected neighbouring cell(s). Typical intervals between such measurements may e.g. be in the range between 10 and 60 ms. Once a new cell becomes sufficiently strong to be included in the active set, or a cell in the active set is becoming weak or both (HO event 1A, 1B, 1C) for a certain time 202 (TTT), a HO event is triggered. HO events can typically happen with a rate corresponding to the measurement interval. The mobile terminal 203 then transmits the HO information 204 to a network node (illustrated by time line 201) of the network. In the Release 99 version of the 3GPP specification, this is disclosed as using the dedicated channel (DCH), with a transmission time interval (TTI) of 10-20 ms. Once the network has initiated a new cell (which may introduce an additional delay of 10-1000 ms) an active set update message 205 is sent to the mobile terminal. Hence a signalling delay of 20-40 ms (uplink and downlink) plus a network delay is introduced in the HO process resulting in a delay $t_D$ in addition to the TTT delay. Adding the NW parameters, TTT and filtering the delay could be very long (in the range of seconds). In many scenarios such a delay may be acceptable, but in complicated environments (for instance dense urban scenarios where many different cells are present and where the signal strength received from the cells varies rapidly), the delay could be unacceptably long, leading to erroneous HO (e.g. due to the delay, the HO may be made to a cell that in fact has become worse than a new detected cell, which might also currently be in the HO signalling stage) and potentially dropped calls.

Similar problems could also happen in LTE as illustrated by FIG. 2b. Even if the HO message is transmitted in one LTE TTI (1 ms) and the NW processing typically is faster than in WCDMA Rel. 99, the delay in the signalling (Scheduling Request, buffer size transmission, message transmission) could be long, especially in high load scenarios in dense urban environments where there could be significant delay in the response to Scheduling Requests (several 10ths of ms). FIG. 2b schematically illustrates an example of LTE HO signalling. In LTE, when an HO event is triggered based on measurements by the mobile terminal 203 at times T0, T1, etc. and after the TTT has elapsed, the mobile terminal 203 sends an initial scheduling request 214 to the network node 201. Upon receipt of a response 216 from the network node, the mobile terminal transmits the actual HO event message 217 resulting in transmission of an update message 215 from the network node to the mobile terminal.

In LTE, a mechanism for re-establishment in case of HO failure exists thus reducing the risk for dropped calls. However, the re-establishment procedure also introduces a delay (in the range of seconds) which might imply that the TCP protocol is stalled and lower TCP throughput will be the result.

Figure 3:
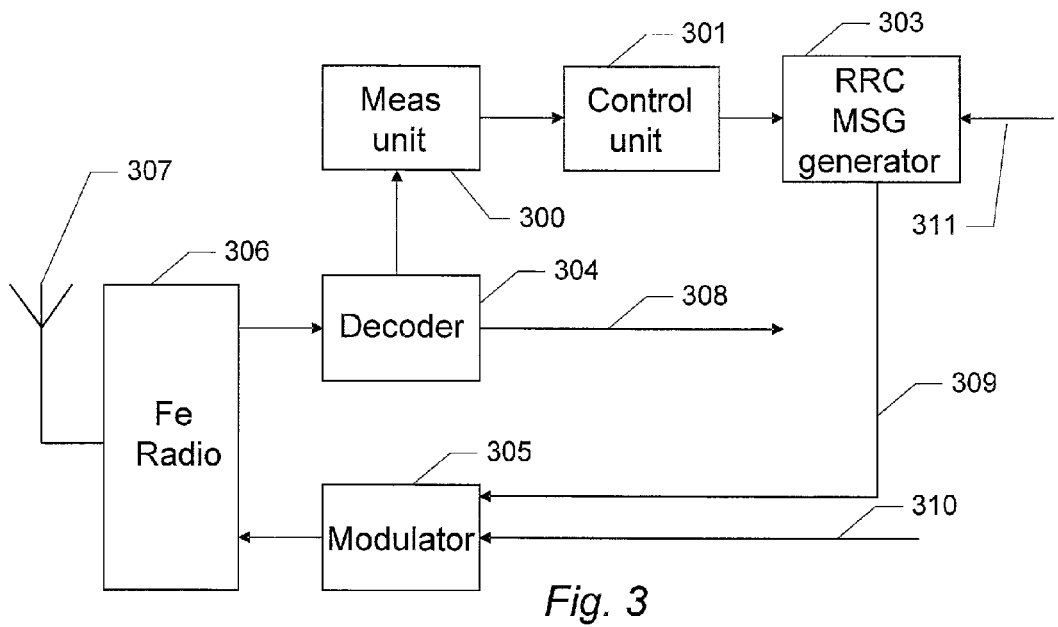
FIG. 3 shows a schematic block diagram of a communications device.
Figure 4:
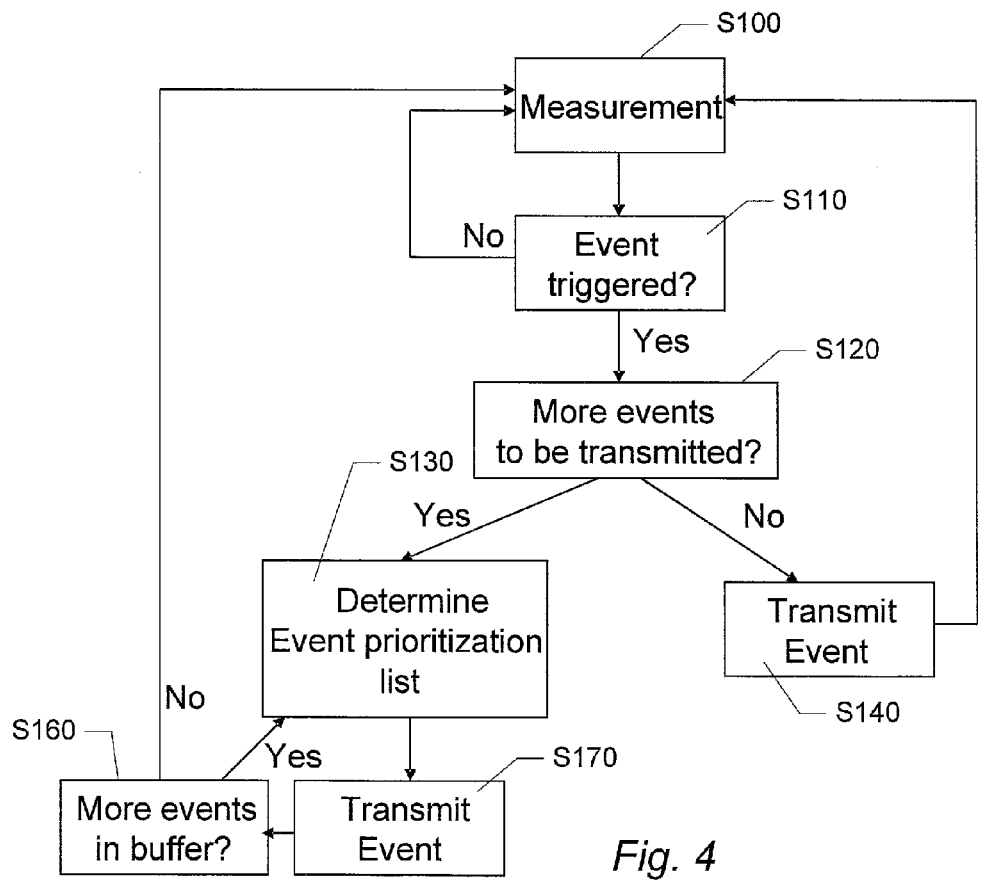
FIG. 4 shows a schematic flow diagram of an example of a process for communicating handover events.

Embodiments of the reporting and prioritization of handover events will now be disclosed in more detail with reference to FIGS. 3 and 4. FIG. 3 shows a schematic block diagram of a communications device, while FIG. 4 shows a schematic flow diagram of an example of a process for communicating handover events.

The communications device, e.g. a mobile terminal, comprises an antenna 307 and a radio interface module 306 connected to the antenna 307 and operable to transmit and receive suitably coded and/or modulated radio signals. To this end, the communications device further comprises a decoder block 304 connected to the radio interface 306 and operable to decode radio signals received by the radio interface resulting in a decoded signal 308. It will be appreciated that the communications device may further comprise further signal processing blocks (not explicitly shown) connected to the decoder 304 and operable to receive and further process the decoded signal 308. The communications device further comprises a modulator block 305 connected to the radio interface 306 and operable to receive data 310 and/or another signal to be transmitted, to modulate the data according to a suitable modulation scheme and to forward the modulated signal to the radio interface for transmission.

The communications device further comprises a measurement unit 300 connected to the decoder 304 and operable to perform one or more types of measurements on the received signal indicative of the cell quality of the cell of the cellular communication network from which the signal has been received. It will be appreciated that the measurement may be performed on the received signal prior to decoding, after decoding and/or at an intermediate stage during the decoding process. Examples of suitable measurements may include the signal strength of the received signal, a signal-to-interference ratio and/or another suitable parameter indicative of the cell quality. Alternatively or additionally, the measurement unit may perform other measurements, e.g. of a Doppler shift of the received signal. For example, the measurement unit may be configured to perform a measurement of one or more parameters at predetermined intervals. In some embodiments, the communications device may perform a cell search at regular intervals resulting in a list of visible cells from which respective signals are received by the communications device; each cell may be identifiable by a unique cell ID. The measurement unit may then perform a measurement of the signal strength and/or another suitable parameter indicative of the cell quality for all cells in the list of visible cells.

The communications device further comprises a control unit 301 connected to the measurement unit 300 and operable to receive the measurement results from the measurement unit. Based on the received measurement results, the control unit is operable to determine whether one or more of a set of trigger conditions, each associated with a respective handover event is fulfilled. To this end, responsive to a certain condition being fulfilled, the control unit may start a trigger timer configured to run for a predetermined time, also referred to as time-to-trigger. If, upon expiry of the timer, the condition is still fulfilled, the control unit may trigger a corresponding handover event. The control unit 301 further performs a prioritization of the triggered handover events as described herein, e.g. by maintaining a prioritized queue of handover events waiting to be reported.

The communications device further comprises a message generator block 303 (e.g. an RRC message generator block) connected to the control unit 301 and operable to receive handover events from the control unit, to generate a corresponding handover message 309 addressed to a suitable network node of the cellular network, and to forward the generated handover message to the modulator 305 for transmission. For example, the message generator may receive the handover event with highest priority from a queue maintained by the control unit, and cause transmission of a suitable message to the network node. When the message has been processed, the message generator may receive the next handover event. The message generator block may also receive other RRC messages 311 not caused by measurements of the measurement unit, e.g. messages for a UE initiated connection release, connection reconfiguration or the like.

Operation of an example of a communications device, e.g. the communications device shown in FIG. 3, for reporting and prioritizing handover events will now be described with reference to FIG. 4. In initial step S100, the communications device is in connected mode and performs signal strength measurements on a regular basis on one or more serving cells (e.g. on cells in the active set) as well as on detected neighbouring cells. Examples of signal strength measurements may include received signal code power (RSCP), RSCP divided by the total received signal strength within the system bandwidth (RSSI), also denoted Ec/No, in WCDMA, and/or reference signal received power (RSRP), reference signal received quality (RSRQ) in LTE, etc., or combinations of the above. Alternatively or additionally, the communications device may perform measurements of other quality parameters indicative of the cell quality of the serving and/or neighbouring cells. In step S110, based on the measurements, a control unit of the communications device monitors whether a HO event is triggered in respect of a cell identified by a cell identifier. For example, the control unit may trigger a HO event of type 1A ("add one cell to the active set"), 1B ("remove one cell in the active set") or 1C ("replace a first cell with a second cell in the active set"). If that is the case, the process proceeds at step S120; otherwise the process returns to step S100. Note that the events triggered in step S110 may correspond to both new and previous measurements, as well as previously triggered events not yet transmitted.

In step S120, the control unit investigates whether there are any other HO events triggered earlier by other cells but not yet transmitted to the network. In some embodiments, the control unit may further identify any HO events to be triggered soon. For example, the control unit may determine whether a trigger timer will expire during a certain period in the future, e.g. a period corresponding to the expected time it takes to execute a HO event. For instance, the control unit may determine that an HO event is "going to be triggered" when there is another neighbouring cell that is stronger than a cell in the active set, however the time-to-trigger has not been enabled (timed out yet), but will likely do so in a near future.

In case there is no other triggered HO event, except a single one triggered in step S110, the HO event is transmitted to the network in step S140, e.g. via Radio resource Control (RRC) signalling. In case there is a queue of HO events to be transmitted, the control unit performs a prioritization of the pending HO events in step S130. To this end, the control unit may maintain a queue or list of pending HO events, and change the order of HO events in the queue/list based on the prioritization.

The prioritisation may be performed based on one or more prioritisation criteria, based e.g. on the time when the respective events have been triggered, the respective event types, the measured signal strengths, etc. or a combination of the above. For instance, newer cells triggering an event may be prioritized over earlier cells triggering an event of the same event type (e.g. a 1A event). As another example, in case a 1B event has been triggered for a cell in the active set, and a 1A event will soon (within, say, one or two measurement samples (10-40 ms) or within another suitable period of time) be triggered for another (neighbouring) cell, the control unit may prioritize the 1A event prior to the 1B event, in order to make sure that a new cell is added to the active set prior to removing another cell. The NW would thus add a new cell to the active set and then remove the other one, thus increasing the diversity, and thereby reducing the risk for lost cells.

In some embodiments, a prioritisation is based on the signal strengths of the cells, e.g. such that neighbouring cells having a higher signal strength have a higher priority to be added to the active set or become serving cell than neighbouring cells with lower signal strength. For instance, if a first neighbouring cell triggers an 1A event with a strong signal strength (e.g. RSCP) and then a second neighbouring cell with a lower RSCP than the first neighbouring cell, the first cell may be prioritized over the second cell, even though the second cell triggered the HO event later than the first neighbouring cell. As another example, in case the strongest cell in the active set (or strongest detected intra-frequency neighbouring cell) is below a threshold (say, close to the REFSENS level), and a, say, 1C event (replace cell) is triggered, and at the same time an Inter-frequency event is triggered (2A—change of best frequency or 2B—other frequency become better than a first thresh and current becomes worse than a second thresh, for instance), the control unit may prioritize to transmit the inter-frequency HO event, in order to improve the overall signal strength. However, in case the signal strength was above a certain threshold, the decision may be to focus on intra frequency HO events instead, since inter frequency events typically include longer interruption times. In some embodiments, the control unit may even discard some HO events.

In some embodiments, the prioritization of events may be done taking an expected validity period of the measurements that have caused the events into consideration. In some embodiments, an estimation of the speed with which the communications device moves relative to the network cells may be used as an input to the prioritisation. Another suitable measure for the expected validity period of measurements may be the estimated speed of the communications device (or a parameter indicative of the estimated speed, e.g. the measured Doppler shift) multiplied by the rate at which HO events are triggered. Other external knowledge, e.g. regarding the local cell planning may also be used to improve the performance, since the problem is more significant in denser networks. This is typically not known to the terminal; instead it may e.g. use statistics on the event occurrence rate to adapt to the current environment. A measure of the validity period may e.g. be used to determine whether a prioritisation of HO events is to be performed (e.g. when the expected validity period is long, e.g. longer than a suitable threshold value, a prioritisation may be omitted). Alternatively or additionally, an estimated validity period may be used in order to change the prioritisation criterion, e.g. whether to use the signal strength as a main criterion or the timing of events.

In step S170, the events are then transmitted according to the prioritized queue/list and HO events are transmitted until the queue of HO events that are ready to be transmitted is empty (S160), or until the control unit determines that new measurements shall be performed (S100), e.g. in order to retain a predetermined measurement update rate.

Although some embodiments have been described and shown in detail, the invention is not restricted to them, but may also be embodied in other ways within the scope of the subject matter defined in the following claims.

The method, product means, and device described herein can be implemented by means of hardware comprising several distinct elements, and/or partly or completely by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage. It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method, implemented by a communications device, for communicating wireless handover events, the communications device being associated with at least one serving cell of a cellular communications network, the method comprising: determining, based on at least one or more first measurement results indicative of one or more cell quality parameters of respective ones of a first plurality of cells of the cellular communications network, a first handover event associated with a first one of the first plurality of cells; initiating communication of a first handover message indicative of the determined first handover event to a network entity of the cellular network; determining, based on at least one or more second measurement results indicative of one or more cell quality parameters of respective ones of a second plurality of cells of the cellular communications network, a plurality of further handover events associated with respective ones of the second plurality of cells, resulting in a plurality of pending handover events waiting to be communicated to the network entity of the cellular network; determining a priority order for at least a subset of the pending handover events, wherein the subset comprises handover events from the first handover event associated with the first one of the first plurality of cells and the plurality of further handover events associated with respective ones of the second plurality of cells; wherein the determining the priority order comprises determining estimated validity periods of at least one of the measurement results used as a basis for each of the subset of pending handover events; wherein the determining the priority order is based on the determined estimated validity periods and at least one of: a signal strength; a rate of occurrence of handover events; a determined speed with which the communications device moves relative to the cellular network; a signal-to-interference ratio of the cells associated with the respective pending handover events; selecting, based on the priority order, a handover event from the first handover event and the pending handover events; and communicating a second handover message indicative of the selected handover event.

2. The method of claim 1: wherein each pending handover event has an associated event time; wherein the determining the priority order comprises determining the priority order based on at least the event times of the respective pending wireless communication handover events.

3. The method of claim 1, further comprising communicating, to the network entity of the cellular network, a second handover event selected from the subset of pending handover events, the second handover event having a highest priority according to the determined priority order.

4. The method of claim 1, wherein the cell quality parameter is one of the signal strength and the signal-to-interference ratio.

5. The method of claim 1, wherein the determining the priority order comprises determining the priority order based on the determined speed with which the communications device moves relative to the cellular network and on the rate of occurrence of handover events.

6. The method of claim 1: wherein the initiating communication of a handover message comprises communicating an initial request to communicate a message; wherein the determining the priority order comprises determining the priority order for the first handover event and for at least a subset of the pending handover events; wherein the method further comprises: receiving a response to the initial request; selecting, based on the priority order, a handover event from the first and the pending handover events; and communicating a handover message indicative of the selected handover event.

7. The method of claim 1: further comprising determining, from at least the second measurement results and based on at least one predetermined selection criterion, one or more likely handover events, the selection criterion being indicative of a likelihood of a handover event being triggered within a predetermined period of time; wherein determining the priority order comprises determining the priority order for the determined likely handover events and for at least a subset of the pending handover events.

8. The method of claim 7, wherein the predetermined selection criterion comprises the second measurement results having exceeded a first threshold smaller than a second threshold required for determining a handover event.

9. The method of claim 1, further comprising: determining at least one parameter indicative of an estimated validity period of handover events; selectively performing the determination of the priority order responsive to the determined at least one parameter.

10. The method of claim 1, wherein: each pending handover event has an associated event type; the determining the priority order is based on at least the event types of the respective pending wireless communication handover events.

11. The method of claim 1, wherein each cell of the cellular communications network has an associated cell identifier allowing the communications device to distinguish different cells of the cellular communications network.

12. The method of claim 1, wherein at least one of the second measurement results is included in the first measurement results.

13. The method of claim 1, wherein at least one of the first plurality of cells is included in the second plurality of cells.

14. The method of claim 1, further comprising: determining one or more likely handover events based on a predetermined selection criterion: indicating a likelihood of a handover event being triggered within a predetermined period of time; and comprising the second measurement results having exceeded a first threshold smaller than a second threshold required for determining a handover event; determining at least one parameter indicative of an estimated validity period of handover events; selectively performing the determination of the priority order responsive to the determined at least one parameter; wherein the determining of the priority order: is based on the determined speed with which the communications device moves relative to the cellular network and on the rate of occurrence of handover events; and comprises determining the priority order for the determined likely handover events and for at least a subset of the pending handover events.

15. The method of claim 1, further comprising: determining one or more likely handover events based on a predetermined selection criterion: indicating a likelihood of a handover event being triggered within a predetermined period of time; and comprising the second measurement results having exceeded a first threshold smaller than a second threshold required for determining a handover event; wherein each pending handover event has an associated event type; wherein the determining of the priority order is based on: the determined speed with which the communications device moves relative to the cellular network; the rate of occurrence of handover events; and the event types of the respective pending wireless communication handover events; wherein the determining of the priority order comprises determining the priority order for the determined likely handover events and for at least a subset of the pending handover events.

16. A communications device, comprising: a measurement circuit configured to obtain a plurality of measurement results indicative of one or more cell quality parameters of respective first plurality of cells of a cellular communications network; a control circuit configured to determine, based on at least a first set of measurement results obtained by the measurement circuit, a first handover event associated with a first one of the cells; a message generator circuit configured to initiate communication of a first handover message indicative of the determined first handover event to a network entity of the cellular network; wherein the communications device is configured to: determine, based on at least the first set of measurement results, a first handover event associated with a first one of the first plurality of cells; initiate communication of the first handover message to the network entity of the cellular network; determine, based on at least one or more second measurement results indicative of one or more cell quality parameters of respective ones of a second plurality of cells of the cellular communications network, a plurality of further handover events associated with respective ones of the second plurality of cells, resulting in a plurality of pending handover events waiting to be communicated to the network entity of the cellular network; determine a priority order for at least a subset of the pending handover events, wherein the subset comprises handover events from the first handover event associated with the first one of the first plurality of cells and the plurality of further handover events associated with respective ones of the second plurality of cells; wherein the determining the priority order comprises determining estimated validity periods of at least one of the measurement results used as a basis for each of the subset of pending handover events; wherein the determining the priority order is based on the determined estimated validity periods and at least one of: a signal strength; a rate of occurrence of handover events; a determined speed with which the communications device moves relative to the cellular network; a signal-to-interference ratio of the cells associated with the respective pending handover events; select, based on the priority order, a handover event from the first handover event and the pending handover events; and communicate a second handover message indicative of the selected handover event.

17. The communications device of claim 16, wherein the control circuit is further configured to determine, based on at least a second set of measurement results obtained by the measurement circuit, a plurality of further handover events associated with respective ones of the cells, resulting in a plurality of pending handover events waiting to be communicated to the network entity of the cellular network.

18. The communications device of claim 16: wherein the communications device is further configured to: determine one or more likely handover events based on a predetermined selection criterion: indicating a likelihood of a handover event being triggered within a predetermined period of time; and comprising the second measurement results having exceeded a first threshold smaller than a second threshold required for determining a handover event; determine at least one parameter indicative of an estimated validity period of handover events; selectively perform the determination of the priority order responsive to the determined at least one parameter; wherein the communications device is configured to determine the priority order based on the determined speed with which the communications device moves relative to the cellular network and on the rate of occurrence of handover events; and wherein to determine the priority order, the communications device is configured to determine the priority order for the determined likely handover events and for at least a subset of the pending handover events.

19. The communications device of claim 16: wherein the communications device is further configured to determine one or more likely handover events based on a predetermined selection criterion: indicating a likelihood of a handover event being triggered within a predetermined period of time; and comprising the second measurement results having exceeded a first threshold smaller than a second threshold required for determining a handover event; wherein each pending handover event has an associated event type; wherein the communications device is configured to determine the priority order based on: the determined speed with which the communications device moves relative to the cellular network; the rate of occurrence of handover events; and the event types of the respective pending wireless communication handover events; wherein to determine the priority order, the communications device is configured to determine the priority order for the determined likely handover events and for at least a subset of the pending handover events.

* * * * *